(12) United States Patent
Seymour et al.

(10) Patent No.: US 11,356,291 B2
(45) Date of Patent: Jun. 7, 2022

(54) BATH CONTROL SECURITY

(71) Applicant: Kohler Mira Limited, Gloucestershire (GB)

(72) Inventors: Christopher Laurence Seymour, Gloucestershire (GB); Alexander Colin Fagg, Gloucestershire (GB); Richard Harcourt Burns, Gloucestershire (GB); Karl Antony Fearnley, Gloucestershire (GB); Christopher John Duke, Gloucestershire (GB)

(73) Assignee: KOHLER MIRA LIMITED

( * ) Notice: Subject to any disclaimer, the term of this patent is extended or adjusted under 35 U.S.C. 154(b) by 0 days.

(21) Appl. No.: 16/510,030

(22) Filed: Jul. 12, 2019

(65) Prior Publication Data
US 2019/0334737 A1   Oct. 31, 2019

Related U.S. Application Data

(63) Continuation of application No. PCT/GB2018/050030, filed on Jan. 8, 2018.

(30) Foreign Application Priority Data

Jan. 13, 2017 (GB) .................................... 1700633

(51) Int. Cl.
*G06F 15/16* (2006.01)
*H04L 12/28* (2006.01)
(Continued)

(52) U.S. Cl.
CPC .......... *H04L 12/2821* (2013.01); *E03C 1/057* (2013.01); *G05D 7/0635* (2013.01); *G05D 23/1927* (2013.01); *H04L 67/125* (2013.01)

(58) Field of Classification Search
CPC ... H04L 12/2821; H04L 67/125; E03C 1/057; G05D 7/0635; G05D 23/1927
(Continued)

(56) References Cited

U.S. PATENT DOCUMENTS

| 4,945,943 A * | 8/1990 | Cogger .............. G05D 23/1393 137/360 |
| 10,382,203 B1 * | 8/2019 | Loladia ..................... H04L 9/30 |

(Continued)

FOREIGN PATENT DOCUMENTS

| CN | 202652271 | 1/2013 |
| CN | 103529774 | 1/2014 |

(Continued)

OTHER PUBLICATIONS

Sound Wave. Kaldewei, Dec. 2014, kaldewei-fa.secure.footprint. net/data/sprachen/englisch/prospekte/installationsanleitungen/EBA_Soundwave_EN_072018.pdf. (Year: 2014).*

(Continued)

*Primary Examiner* — Kaylee J Huang
(74) *Attorney, Agent, or Firm* — Foley & Lardner LLP

(57) ABSTRACT

A control system for a bathing apparatus includes a pairing station associated with the bathing apparatus and having a pairing interface, and a portable user device arranged to be used to control the bathing apparatus, the portable user device being able to control one or more functions of the bathing apparatus only while it is paired with the pairing station. The portable user device is paired with the pairing station by activation of the pairing interface when the portable user device is in a pairing region.

20 Claims, 3 Drawing Sheets

(51) Int. Cl.
  *E03C 1/05* (2006.01)
  *G05D 7/06* (2006.01)
  *G05D 23/19* (2006.01)
  *H04L 67/125* (2022.01)
(58) Field of Classification Search
  USPC .................. 709/217, 219, 222, 227, 229
  See application file for complete search history.

(56) References Cited

U.S. PATENT DOCUMENTS

| | | | |
|---|---|---|---|
| 2009/0113538 A1* | 4/2009 | Eom .................. | G06F 21/629 726/12 |
| 2011/0195664 A1 | 8/2011 | Keirstead | |
| 2016/0129464 A1* | 5/2016 | Frommer ............ | G05D 7/0635 700/282 |
| 2016/0258144 A1* | 9/2016 | Tayenaka ............ | E03C 1/025 |
| 2017/0041159 A1* | 2/2017 | Laflamme ........... | G05B 19/042 |
| 2017/0142086 A1* | 5/2017 | Chen .................. | H04L 67/10 |
| 2018/0012471 A1* | 1/2018 | Bauer ................. | H04W 4/029 |
| 2018/0027635 A1* | 1/2018 | Roquemore, III ............ H04W 52/0229 315/307 |
| 2020/0084312 A1* | 3/2020 | Kim .................. | H04R 1/1025 |

FOREIGN PATENT DOCUMENTS

| | | | | |
|---|---|---|---|---|
| CN | 104202350 | | 12/2014 | |
| CN | 104202350 A | * | 12/2014 | |
| CN | 104536561 | | 4/2015 | |
| CN | 205693687 | | 11/2016 | |
| GB | 2529645 A | * | 3/2016 | ........ E03C 1/0409 |
| WO | WO2014/035637 | | 3/2014 | |
| WO | WO2016/141345 | | 9/2016 | |

OTHER PUBLICATIONS

English translation of CN 104202350 A as provided by Espacenet.*
"CalderaSpas Paradise Series 2017 Owner's Manual." Manuals Library, Watkins Manufacturing Corporation, Jan. 2017, www.manualslib.com/manual/1231999/Calderaspas-Paradise-Series.html?page=19. (Year: 2017).*
International Search Report re Application No. PCT/GB2018/050030; 2 pgs.
Search Report on British Application No. 1700633.9, dated Jun. 9, 2017.

* cited by examiner

BATH CONTROL SECURITY

CROSS-REFERENCE TO RELATED PATENT APPLICATIONS

The present application is a Continuation of International Application No. PCT/GB2018/050030, filed Jan. 8, 2018, which claim priority to and the benefit of United Kingdom Patent Application No. GB 1700633.9, filed Jan. 13, 2017. The entire disclosures of each of the foregoing applications are incorporated by reference herein.

This application is related to and incorporates by reference (but does not claim priority to) the following United Kingdom Patent Applications, each of which were filed on Jan. 13, 2017: GB 1700631.3; GB 1700636.2; and GB 1700630.5.

BACKGROUND

The invention relates to systems in which portable user devices can be used to control a bathing apparatus and in particular to improving security of remote control of the bathing apparatus. In particular, the invention relates to a security step to determine which portable user devices can or cannot control certain functions of the bathing apparatus.

In the prior art, home automation systems which can be controlled by a smartphone so as to control a shower or bath are known. For example, US 2016/335423 (A) discloses such a system in which a user can be authorized for providing a command, for example by the user's location.

SUMMARY

An exemplary embodiment relates to a control system for a bathing apparatus that includes a pairing station associated with the bathing apparatus and having a pairing interface; and a portable user device arranged to be used to control the bathing apparatus, the portable user device being able to control one or more functions of the bathing apparatus only while it is paired with the pairing station. The portable user device is paired with the pairing station by activation of the pairing interface when the portable user device is in a pairing region.

Another exemplary embodiment relates to a controllable bathing system that includes a bathing apparatus; a pairing station associated with the bathing apparatus and having a pairing interface; and a portable user device arranged to be used to control the bathing apparatus, the portable user device being able to control one or more functions of the bathing apparatus only while it is paired with the pairing station. The portable user device is paired with the pairing station by activation of the pairing interface when the portable user device is in a pairing region.

Another exemplary embodiment relates to a method of controlling a bathing apparatus that includes pairing a portable user device arranged to be used to control the bathing apparatus with a pairing station associated with the bathing apparatus, wherein the portable user device is paired with the pairing station by activation of a pairing interface of the pairing station when the portable user device is in a pairing region; receiving, at the portable user device, user input relating to desired control of the bathing apparatus; and sending, from the portable user device, a control signal arranged to cause the bathing apparatus to respond to the user input. The portable user device can only be used to control one or more functions of the bathing apparatus while it is paired with the pairing station.

Another exemplary embodiment relates to a computer application for controlling a bathing apparatus, the computer application being arranged to pair a portable user device on which the computer application is installed with a pairing station associated with the bathing apparatus, wherein the portable user device is paired with the pairing station by activation of a pairing interface of the pairing station when the portable user device is in a pairing region; receive user input relating to desired control of the bathing apparatus; and send a control signal arranged to cause the bathing apparatus to respond to the user input. The computer application can only be used to control one or more functions of the bathing apparatus while the portable user device on which it is installed is paired with the pairing station.

BRIEF DESCRIPTION OF THE DRAWINGS

There now follows by way of example only a detailed description of embodiments of the present invention with reference to the accompanying drawings in which.

DETAILED DESCRIPTION

Figure 1:
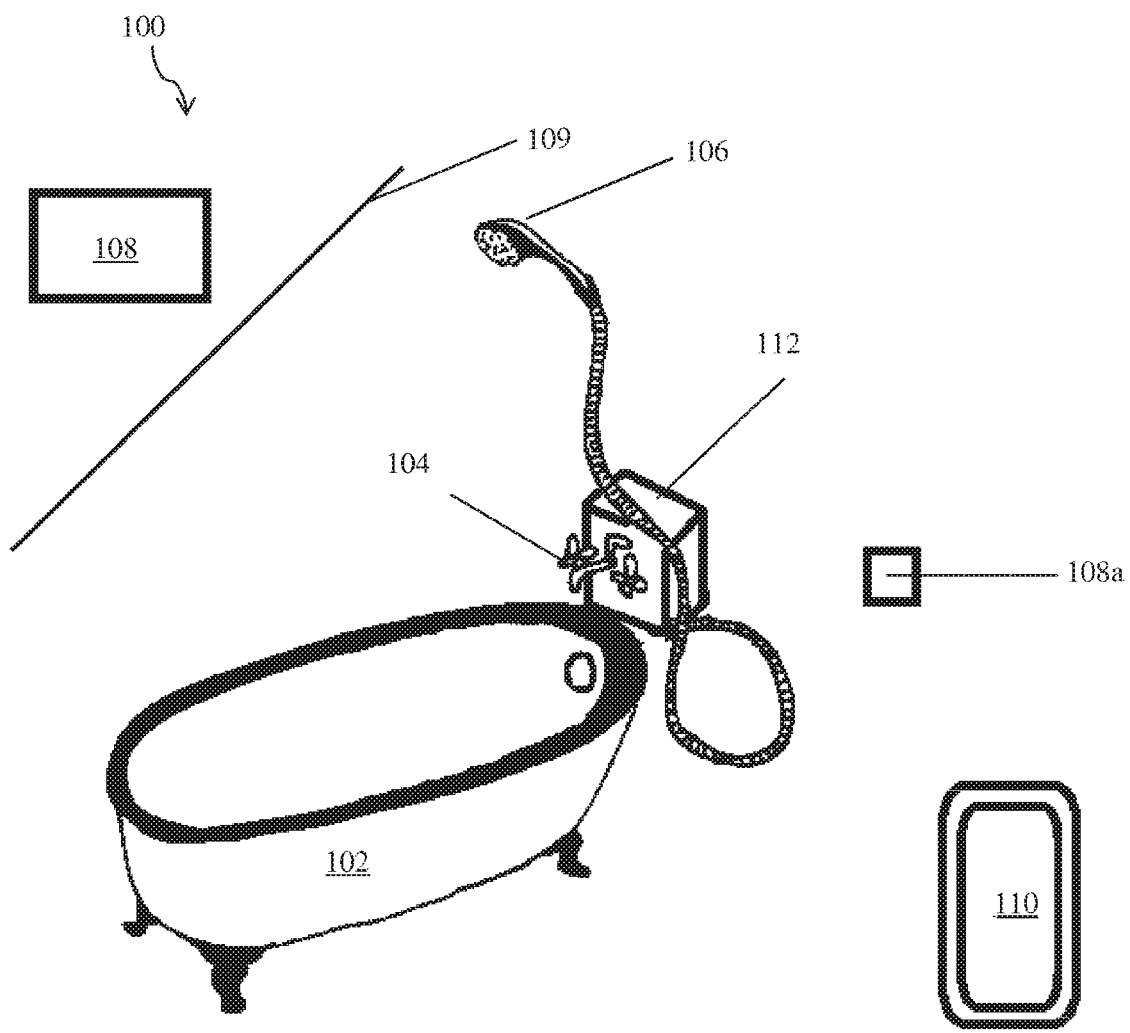
FIG. 1 is a schematic representation of a controllable bathing system of an embodiment of the invention.

According to a first aspect of the invention, there is provided a control system for a bathing apparatus. The control system comprises a pairing station associated with the bathing apparatus and having a pairing interface; and a portable user device arranged to be used to control the bathing apparatus. The portable user device is arranged to control one or more functions of the bathing apparatus only while it is paired with the pairing station. The portable user device is paired with the pairing station by activation of the pairing interface when the portable user device is in a pairing region.

Advantageously, the pairing region may be a secure pairing region in that it is a region to which people not intended to be users of the bathing apparatus would not normally or easily have access.

According to a second aspect of the invention, there is provided a controllable bathing system comprising a bathing apparatus; a pairing station associated with the bathing apparatus and having a pairing interface; and a portable user device arranged to be used to control the bathing apparatus. The portable user device is arranged to control one or more functions of the bathing apparatus only while it is paired with the pairing station. The portable user device is paired with the pairing station by activation of the pairing interface when the portable user device is in a pairing region.

According to a third aspect of the invention, there is provided a method of controlling a bathing apparatus. The method comprises pairing a portable user device arranged to be used to control the bathing apparatus with a pairing station associated with the bathing apparatus, wherein the portable user device is paired with the pairing station by activation of a pairing interface of the pairing station when the portable user device is in a pairing region; receiving, at the portable user device, user input relating to desired control of the bathing apparatus; and sending, from the portable user device, a control signal arranged to cause the bathing apparatus to respond to the user input. The portable user device can only be used to control one or more functions of the bathing apparatus while it is paired with the pairing station.

According to a fourth aspect of the invention, there is provided a computer application for controlling a bathing apparatus. The computer application is arranged to pair a portable user device on which the computer application is installed with a pairing station associated with the bathing apparatus, wherein the portable user device is paired with the pairing station by activation of a pairing interface of the pairing station when the portable user device is in a pairing region; receive user input relating to desired control of the bathing apparatus; and send a control signal arranged to cause the bathing apparatus to respond to the user input. The computer application can only be used to control one or more functions of the bathing apparatus while the portable user device on which it is installed is paired with the pairing station.

The portable user device may be used to control the bathing apparatus remotely.

Advantageously, the requirement for devices to be paired with a pairing station before being used to control the one or more functions of the bathing apparatus may reduce or eliminate accidental or malicious remote activation of the bathing apparatus, for example by a passer-by or neighbor with the same computer application installed on a personal device. Security may therefore be improved.

In the bathing system, control system, computer application or method of any aspect of the invention, the pairing region may be a region within a set range of the pairing station. The set range may be a set maximum distance. The set range may be a maximum distance over which communications can be sent between the portable user device and the pairing station by a specified method. Alternatively or additionally, the pairing region may be a region within a set range of a relay arranged to relay a signal from the portable user device to the pairing station.

The pairing interface may be, or may comprise, a button, and pairing of the portable user device to the pairing station may be performed or initiated by depressing the button when the portable user device is within the pairing region.

The pairing interface may be located in a secure location, which may increase security of pairing. For example, the pairing interface may be located in a bathroom containing the bathing apparatus, such that a user has to have access to the bathroom in question to pair the device. Alternatively or additionally, the pairing interface may be hidden such that a user could not easily spot it without knowing where to look. Alternatively or additionally, the pairing interface may be located remotely from the bathing apparatus, for example in a different room. In some embodiments, access to the pairing interface may be restricted, for example by locating it within a locked room or safe.

The portable user device may communicate with the pairing station wirelessly, and the pairing region is the region within a maximum distance over which communications can be exchanged wirelessly between the portable user device and the pairing station.

The portable user device may communicate with the pairing station using Bluetooth®; in this case the portable user device is held within Bluetooth® range of the pairing station, or of a relay in communication with the pairing station, for pairing to occur.

Once the portable user device has been coupled with the pairing station, the device may subsequently be used to control the one or more functions of the bathing apparatus remotely without a need for further by activation of the pairing interface.

The pairing interface may be, or may be located on or by, a control valve or control valve actuation means of the bathing apparatus.

The pairing interface may be, or may be integral with, a control knob or control lever of the bathing apparatus.

The pairing interface may be integral with, or located on or in the region of, the bathing apparatus. For example, the pairing interface may be located in the same room as the bathing apparatus, e.g. a bathroom, by an entrance to the room containing the bathing apparatus, or within a set distance of the bathing apparatus, e.g. 1 m, 2 m, 5 m, or 10 m. Advantageously, this may increase convenience for a user who is bathing or about to bathe, as there is no need to visit a separate location to pair before using the portable user device fully.

In embodiments in which communications can be sent between the portable user device and the pairing station by a specified method, the specified method may be one or more of the following, or similar technologies:
 (i) physical docking of the device with the station;
 (ii) Bluetooth®;
 (iii) Wi-Fi;
 (iv) near-field communication.

The one or more functions of the bathing apparatus that can only be controlled via the portable user device after it has been paired with the pairing station may be:
 (i) all functions of the bathing apparatus; or
 (ii) a subset of functions of the bathing apparatus.

The pairing interface may be any interface which requires a user's presence for activation.

The pairing interface may be, or may comprise, one or more of the following:
 (i) a proximity or pressure sensor;
 (ii) a button, lever or rotary control;
 (iii) a finger print, facial or retinal scanner or the likes;
 (iv) a voice recognition unit; and/or
 (v) a user interface of a computing device linked to the bathing apparatus.

The pairing interface may be separate from, but in communication with, a processing apparatus of the pairing station. In such cases, the pairing station, and/or a relay in communication with the pairing interface, may be near to the pairing interface.

After a set time period, the pairing between the portable user device and the pairing station may expire such that the portable user device can no longer control the one or more functions of the bathing apparatus. Re-pairing may then be possible using the method described above.

Multiple portable user devices may be paired with the bathing apparatus. Pairing may be performed for some or all of the multiple devices at the same time, in some embodiments. In other embodiments, pairing may only be performed for one device at once. In some embodiments, there may be a cap on the number of devices that can be paired with the bathing apparatus, and/or a cap on the number of bathing apparatuses with which a single device can be paired. For example, a maximum of 1, 2, 5, 8, or 10 devices may be paired to a given bathing apparatus.

In embodiments including a computer application, the computer application may have a pairing mode. In such embodiments, the application may need to be in the pairing mode when the pairing interface is activated for pairing to be successful.

The skilled person would understand that features described with respect to one aspect of the invention may be applied, mutatis mutandis, to the other aspect of the invention.

In the Figures, like reference numerals are used for like components.

FIG. 1 shows a controllable bathing system 100. The controllable bathing system 100 comprises a bath tub 102, a mixer tap 104 and a shower 106.

In alternative or additional embodiments, the bathing system 100 may comprise a sink, a dual outlet shower, a bidet, no shower 106, separate taps instead of the mixer tap 104, and/or no bath tub 102. The skilled person will appreciate that the following description can be applied to any bathing apparatus 100 and is not limited to the example shown.

The controllable bathing system 100 further comprises a pairing station 108 associated with the bathing apparatus 100. The pairing station 108 has a pairing interface 108a. In the embodiment shown in FIG. 1, the pairing interface 108a is separate from the pairing station 108. In alternative embodiments, the pairing interface 108a may be integral with the pairing station 108. For example, the pairing interface 108a and the pairing station 108 may be provided within a single pairing housing.

In the embodiment being described, the pairing station 108 is located on a valve which feeds the bathing apparatus 100. The pairing station 108 is behind a panel 109 of a room in which the bathing apparatus 100 is located, and is therefore not visible to a user. In alternative embodiments, the pairing station 108 may not be located on a valve, and/or may be wall- or ceiling-mounted within the room, or located in a different room.

The pairing interface 108a is a button and is visible to, and accessible by, a user. In the embodiment being described, the button is wall-mounted. In alternative embodiments, the button may be integral with a tap or a physical shower control means.

A portable user device 110 comprising suitable software can be paired with the pairing station 108 by activation of the pairing interface 108a when the user device 110 is in a pairing region.

In the embodiment being described, the pairing interface 108a is activated by depressing the button 108a. In this case, the button is depressed for a period of at least three seconds for pairing to be successful. The skilled person will appreciate that activation methods will vary depending on the type of pairing interface, that a different set period of activation may be selected (e.g. 1 second, 2 seconds, 5 seconds or 10 seconds) and/or that a set period of activation may not be required in some embodiments.

In the embodiment being described, the pairing region is defined by a range from the pairing station 108. Pairing between the device 110 and the pairing station 108 is performed using Bluetooth® and the pairing region is the region in which the device 110 can communicate with the pairing station 108 via Bluetooth®.

In alternative or additional embodiments, the pairing region may be defined differently, and/or a different communication means may be used.

For example, the pairing region may be defined using location services such as Global Positioning Services (GPS) or the likes to determine the location of the device 110, or by location relative to a boundary such as the perimeter of the room in which the bathing apparatus 100 is located. Communications may be via Wi-Fi, near-field communication or other wireless communication methods instead of, or as well as, Bluetooth®. The skilled person will appreciate that any such communication method may be used and that the examples described herein are not intended to limit the scope of the invention. Additionally or alternatively, communication may be via a physical docking of the device 110 with the pairing station 108; in such cases cable length may determine the pairing region.

In alternative or additional embodiments, a relay (not shown) may be used. The relay is separate from, but in communication with, the pairing station 108 and arranged to relay a signal from the user device 110 to the pairing station 108 and/or to relay a signal from the pairing station 108 to the user device 110. The communication may be wired or wireless. The relay may be located closer to the bathing apparatus 100 than the pairing station 108 is, and, for example, may be integral with the pairing interface 108a or a shower control unit or the likes. In such embodiments, the pairing region may be defined with respect to the relay; for example being a region within a set radius of the relay, or a region in which Bluetooth® communication between the device 110 and the relay is possible.

In the embodiment being described, when the user device 110 is paired with the pairing station 108, the pairing station 108 transmits an authentication code, or password, to the user device 110. In alternative or additional embodiments, a password may be provided by the user device 110 to the pairing station 108. The password may be automatically generated or entered by a user of the device 110.

In the embodiment being described, the authentication code is a randomly generated number. The authentication code is then saved on the user device 110 and used to authenticate the device 110 in future communications with the bathing apparatus 100.

Multiple devices 110 may therefore be paired with the bathing apparatus 100, each device 110 having its own authentication code.

Before the user device 110 has been paired with the pairing station 108, the device 110 cannot be used to control one or more functions of the bathing apparatus 100 remotely, as it is not authorized to do so (i.e. it is not successfully paired). In the embodiment being described, the one or more functions are all functions of the bathing apparatus 100. In alternative embodiments, user devices 110 may be able to control some functions, but not others, prior to pairing. For example, any unpaired user device 110 may be used to turn off water flow, but not to turn it on, in some embodiments.

Once the user device 110 has been paired with the pairing station 108, the device 110 can be used to control the one or more functions of the bathing apparatus 100 remotely. The authentication code provided during pairing is used to show that the device 110 is authorized.

In the embodiment being described, although multiple devices 110 may be paired with the pairing station 108 at any time, only a single device 110 can communicate with the bathing apparatus 100 by way of providing bathing control instructions (e.g. to turn a shower on at a specified temperature) at any one time. Potentially conflicting instructions from other devices 110 are therefore blocked. The applicant's corresponding United Kingdom Patent Application No. GB 1700636.2, entitled "CONTROL OF BATHING APPARATUS" and filed on Jan. 13, 2017, the content of which is incorporated herein by reference, provides further details of how the blocking of instructions from other devices or users is achieved. In alternative embodiments, other methods of avoiding conflicts may be applied.

In the embodiment being described, bathing control instructions are sent from the user device 110 to the pairing station 108, which also functions as a controller for the bathing apparatus 100. The pairing station 108 then initiates changes to the valves and/or other control mechanisms of the bathing apparatus 100 so as to implement the bathing control instructions.

In alternative or additional embodiments, the pairing station 108 may relay the bathing control instructions to a control unit 112, or the user device 110 may communicate with a control unit 112 directly when issuing bathing control instructions, instead of via the pairing station 108.

Figure 2:
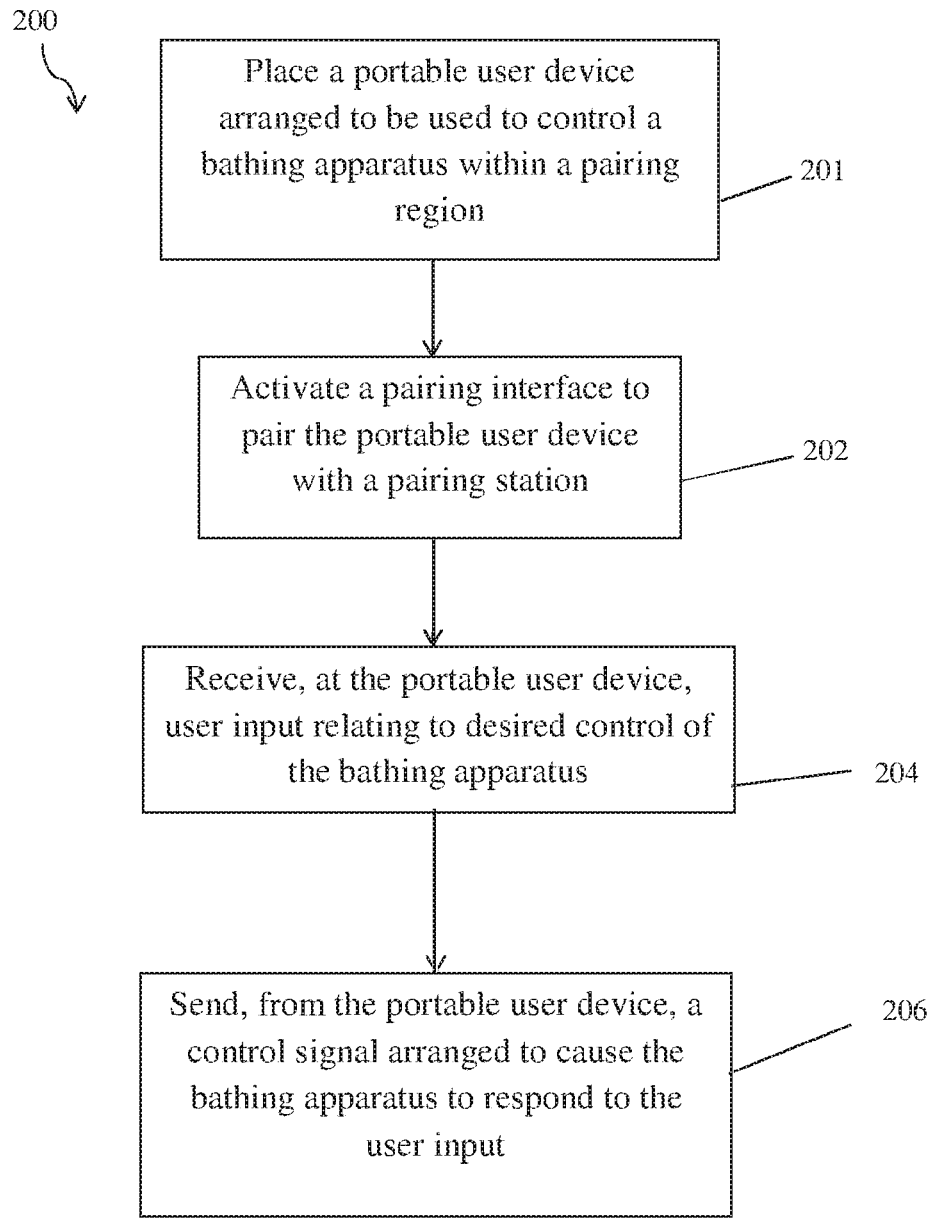
FIG. 2 is a flow chart illustrating the method of an embodiment.

FIG. 2 provides a flow chart showing the pairing method 200 described herein.

At step 201, a portable user device 110 which is arranged to be used to control the bathing apparatus 100 is brought, or positioned, within a pairing region.

At step 202, the portable user device 110 is paired with a pairing station 108 by activation of a pairing interface 108a. The portable user device 110, pairing station 108 and pairing 202 may have any of the properties described above.

In alternative or additional embodiments, steps 201 and 202 may be reversed such that the pairing interface 108a is activated and the portable user device 110 then moved to be within the pairing region, optionally within a set time of, or during a period of, activation of the pairing interface 108a.

In the embodiment being described, the pairing 202 comprises configuring the device 110 into a pairing mode, for example by selection of a "Pairing" option, and then activating a pairing interface 108a. Activation of the pairing interface 108a causes an authentication code to be transmitted between the pairing station 108 and the user device 110, resulting in the user device 110 having an authentication code arranged to authorize the user device 110 to control one or more functions of the bathing apparatus 100.

In alternative embodiments, the "Pairing" option on the user device 110 may only become available once the pairing interface 108a has been activated, and two activations of the pairing interface 108a may be needed in some embodiments; one to make the "Pairing" option available and another to confirm the pairing once that option has been selected.

In the embodiment being described, the portable user device 110 must also be placed into the pairing mode for pairing to be successful. In additional or alternative embodiments, one or more different actions must be performed on, or conditions met by, the portable user device 110 in order for pairing to be successful, or the presence of the portable user device 110 may be sufficient without any pairing mode being used.

At step 204, user input relating to desired control of the bathing apparatus 100 is received, at the portable user device 110. The receipt is the result of user selection of a bathing control instruction in the embodiment being described.

At step 206, a control signal arranged to cause the bathing apparatus 100 to respond to the user input is sent from the portable user device 110. In the embodiment being described, the control signal is sent via the pairing station 108. In alternative or additional embodiments, the control signal may be sent directly or indirectly.

Figure 3:
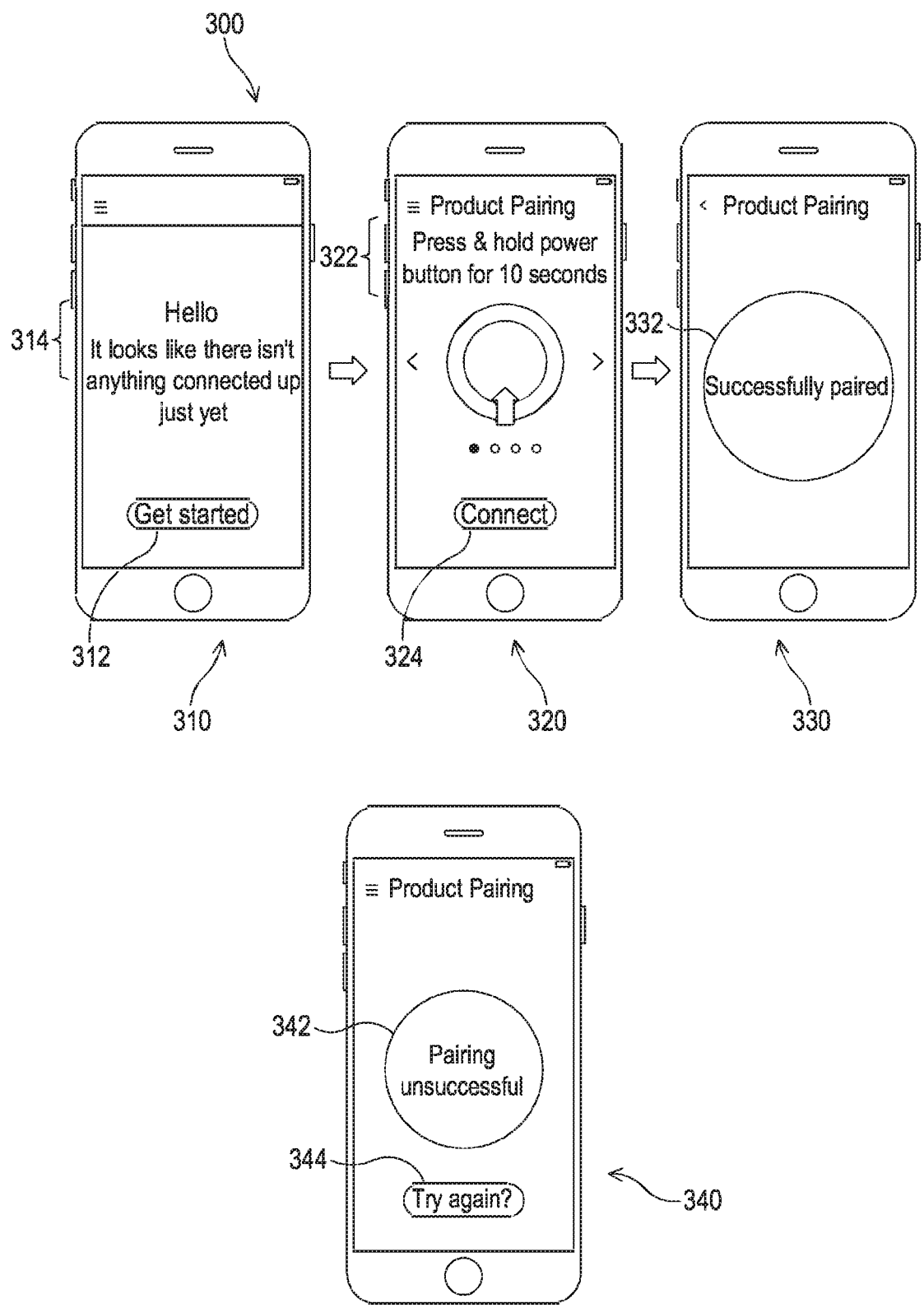
FIG. 3 shows schematic views of a computer application used to implement the method of FIG. 2.

FIG. 3 shows a selection of screenshots 300 from a schematic example of a computer application for use with a touch screen device.

The computer application is arranged to allow a user to control the bathing apparatus 100 via a user device 110 on which the application is installed. The application is arranged to allow a user to raise or lower water temperature and raise or lower flow rate through any one or more selected outlets, such as the shower 106 and/or one or more taps 104.

In addition to allowing a user to control the bathing apparatus 100, the application is also arranged to allow a user to customize his or her account. For example, a background image and user icon may be selected and used, and/or a "favorites" page may be provided for a user's most commonly-used options. In the embodiment being described, the application is also arranged to allow a user to save particular settings (e.g. desired shower temperature and duration, or desired bath depth and temperature) for future use. Default options may also be provided in at least some embodiments, and may be editable to allow adjustment to user preferences. The saved settings can then be selected and implemented automatically.

In the embodiment being described, any user can customize his or her user account, or enter information on particular settings for future use at any point, whether or not the bathing apparatus 100 is in use, and whether or not the user account is paired to any bathing apparatus. The activities that are available to a particular user via that user's account whether or not the bathing apparatus 100 is in use, and whether or not the user account is paired to any bathing apparatus are activities which only affect that user and do not have an immediate effect upon the bathing apparatus 100. These may be referred to as personal activities. Activities which do affect other users, and/or which change the functioning of the bathing apparatus 100, are blocked. In alternative or additional embodiments, no activities may be available to an unpaired device 110, and/or a different subset of activities may be available (for example, only account customization, not changes to bathing settings for future use).

In the embodiment being described, the application offers the ability to control multiple different bathing apparatuses 100 with the same user account.

A first screenshot 310 shows a bathing control application launch page 310 with a button labelled 312 "Get Started". Text 314 on the screen 310 indicates that no bathing apparatus is currently paired with the device 110 on which the application is being run.

A second screenshot 320 shows a screen which is presented once the "Get Started" button 312 has been selected. This screen 320 corresponds to a pairing mode of the application. Text 322 on the screen 320 invites a user to activate a control interface 108a of a bathing apparatus 100 so as to pair that bathing apparatus with the device 110 on which the application is being run, in this case pressing and holding a power button of the bathing apparatus 100 for at least three seconds.

As a result of following the instruction, an authorization code which can be used to authorize the user device 110 to control the bathing apparatus 100 is generated by the pairing station 108, transmitted to the user device 110 and stored on the user device 110. In alternative or additional embodiments, the code may be generated by the user device 110, or entered by a user of the user device 110, transmitted to the pairing station 108 and stored on the pairing station 108. In alternative or additional embodiments, the code may be stored remotely in such a way that it is accessible to the user device 110 and/or the pairing station 108 instead of, or in addition to, being stored in a memory physically located in the user device 110 or the pairing station 108.

The button 324 labelled, "Connect" is initially not selectable by a user, and is greyed out to indicate this. Once the user device 110 has been paired with the pairing station 108, the "Connect" button 324 becomes user-selectable.

In alternative or additional embodiments, user interaction with the user device 110 may be required whilst the device 110 is in the pairing mode, in addition to activation of the pairing interface 108a. In such cases, the "Connect" button 324 may be replaced with a "Pair" button which is user-selectable before the user device 110 is paired.

A third screenshot 330 shows a screen which is presented in the embodiment being described to confirm that the user device 110 has been successfully paired to the pairing station 108. A message 332 displayed on the screen 330 states that pairing has been successful.

An equivalent screen 340 with an error message 342 may be displayed if pairing is unsuccessful.

In the embodiment being described, the error message 342 states, "Pairing Unsuccessful". In the embodiment being described, details associated with the error message 342 are accessed by touching the screen in the region of error message 342. The details indicate a reason for the failure, for example the user device 110 being outside of the pairing region, there being too many devices 110 already paired to that bathing apparatus 100, or there being too many bathing apparatuses 100 already paired to that device 110.

A user may be invited by the details associated with the error message 342 to delete pairings on the user device 110 or to delete user devices 110 from a pairing list for that bathing apparatus 100, or provided with an indication of where to move to enter the pairing region, as applicable.

The screen 340 with the error message 342 has a "Re-try" button 344; selection of this button 344 initiates a second pairing attempt.

The skilled person will appreciate that these screenshots 300 are provided by way of example only and are in no way intended to limit the invention to the particular presentation and/or content shown. In particular, fewer, more or different user options may be presented, the interface may have a different layout and/or control means (for example, a keyboard and/or mouse instead of a touch screen), and different text and/or graphics may be used.

The applicant's corresponding United Kingdom Patent Application No. GB 1700631.3 "BATH FILLING" and filed on Jan. 13, 2017, the contents of which are hereby incorporated by reference, provides further details of optional features and functions of the computer application described herein.

The applicant's corresponding United Kingdom Patent Application No. GB 1700630.5, entitled "MULTIPLE OUTLET SHOWER CONTROL" and filed on Jan. 13, 2017, the contents of which are hereby incorporated by reference, provides further details of optional features and functions of the computer application described herein.

What is claimed is:

1. A shower control system for a shower, the shower control system comprising:
   a pairing station associated with the shower and having a pairing interface, and wherein the pairing interface is located on or in the region of the shower and comprises a wall-mounted button that is configured to require a user's presence for activation; and
   a portable user device arranged to be used to control the shower, the portable user device being able to control one or more functions of the shower only while the portable user device is paired with the pairing station, the one or more functions including one or more of changing water temperature and changing flow rate of water through any one or more selected outlets of the shower;
   wherein the portable user device is paired with the pairing station by activation of the pairing interface by the user when the portable user device is in a pairing region, wherein pressing the wall-mounted button authorizes the portable user device to provide control signals to a control valve of the shower and the wall-mounted button is remote and separate from the control valve.

2. The shower control system of claim 1, wherein the pairing region comprises a region within a set range of the pairing station.

3. The shower control system of claim 2, wherein the set range is a maximum distance over which communications can be sent between the portable user device and the pairing station by a specified method.

4. The shower control system of claim 1, wherein the pairing region comprises a region within a set range of a relay arranged to relay a signal from the portable user device to the pairing station.

5. The shower control system of claim 4, wherein the set range is a set maximum distance.

6. The shower control system of claim 1, wherein the pairing interface comprises a button, and pairing of the portable user device to the pairing station is performed or initiated by depressing the button when the portable user device is within the pairing region.

7. The shower control system of claim 1, wherein the portable user device communicates wirelessly with the pairing station, and the pairing region is the region within a maximum distance over which communications can be exchanged wirelessly between the portable user device and the pairing station.

8. The shower control system of claim 1, wherein the pairing interface is integral with the shower.

9. The shower control system of claim 1, wherein, once the portable user device has been coupled with the pairing station, the portable user device can subsequently be used to control the one or more functions of the shower remotely without a need for further activation of the pairing interface.

10. The shower control system of claim 1, wherein the pairing interface is, or is located on or by, a control valve or control valve actuation means of the shower.

11. The shower control system of claim 1, wherein the pairing interface is, or is integral with, a control knob or control lever of the shower.

12. The shower control system of claim 1, wherein the portable user device communicates with the pairing station using a wireless communication protocol, and the portable user device must be held within a predetermined wireless communication range of the pairing station for pairing to occur.

13. The shower control system of claim 1, wherein the pairing interface is or comprises at least one of the following:
   (i) a proximity or pressure sensor;
   (ii) a button, lever or rotary control;
   (iii) a finger print, facial or retinal scanner;
   (iv) a voice recognition unit; or
   (v) a user interface of a computing device linked to the shower.

14. The shower control system of claim 1, wherein the pairing interface is separate from, but in communication with, a processing apparatus of the pairing station.

15. The shower control system of claim 1, wherein multiple portable user devices may be paired with the shower.

16. The shower control system of claim 1, wherein, to pair the portable user device with the pairing station, two activations of the pairing interface are required, wherein the two activations include a first activation to make a pairing option available at the portable user device and a second activation to confirm pairing after the pairing option has been selected.

17. A controllable bathing system comprising:
    a shower;
    a pairing station associated with the shower and having a pairing interface, wherein the pairing interface is located on or in the region of the shower and comprises a wall-mounted button that is configured to require a user's presence for activation; and
    a portable user device arranged to be used to control the shower, the portable user device being able to control one or more functions of the shower only while the portable user device is paired with the pairing station, the one or more functions including one or more of changing water temperature and changing flow rate of water through any one or more selected outlets of the shower;
    wherein the portable user device is paired with the pairing station by activation of the pairing interface by the user when the portable user device is in a pairing region and wherein pressing the wall-mounted button authorizes the portable user device to provide control signals to a control valve of the shower and the wall-mounted button is remote and separate from the control valve.

18. A method of controlling a shower, the method comprising:
    pairing a portable user device arranged to be used to control the shower with a pairing station associated with the shower, wherein the portable user device is paired with the pairing station by activation of a pairing interface of the pairing station by the user when the portable user device is in a pairing region, wherein pairing the portable user device with the pairing station authorizes the portable user device to provide control signals to the pairing station and the pairing station relays the control signals to the shower, and wherein the pairing interface is located on or in the region of the shower and comprises a wall-mounted button that is configured to require a user's presence for activation;
    receiving, at the portable user device, user input relating to desired control of the shower; and
    sending, from the portable user device, a control signal arranged to cause the shower to respond to the user input;
    wherein the portable user device can only be used to control one or more functions of the shower while the portable user device is paired with the pairing station, the one or more functions including one or more of changing water temperature and changing flow rate of water through any one or more selected outlets of the shower.

19. A non-transitory computer-readable medium containing instructions constituting a computer application for controlling a shower, the computer application being arranged to:
    pair a portable user device on which the computer application is installed with a pairing station associated with the shower, wherein the portable user device is paired with the pairing station by activation of a pairing interface of the pairing station by the user when the portable user device is in a pairing region, wherein pairing the portable user device with the pairing station authorizes the portable user device to provide control signals to the pairing station and the pairing station relays the control signals to the shower, wherein the pairing interface is located on or in the region of the shower and comprises a wall-mounted button that is configured to require a user's presence for activation;
    receive user input relating to desired control of the shower; and
    send a control signal arranged to cause the shower to respond to the user input;
    wherein the computer application can only be used to control one or more functions of the shower while the portable user device on which the computer application is installed is paired with the pairing station, the one or more functions including one or more of changing water temperature and changing flow rate of water through any one or more selected outlets of the shower.

20. The non-transitory computer-readable medium of claim 19, wherein the computer application has a pairing mode and must be in the pairing mode when the pairing interface is activated for pairing to be successful.

* * * * *